United States Patent
Shi et al.

(10) Patent No.: US 10,627,201 B2
(45) Date of Patent: Apr. 21, 2020

(54) RANGING SYSTEM

(71) Applicant: NORTHWEST INSTRUMENT INC., Budd Lake, NJ (US)

(72) Inventors: Xin Shi, Shanghai (CN); David Xing, Budd Lake, NJ (US)

(73) Assignee: NORTHWEST INSTRUMENT INC., Budd Lake, NJ (US)

( * ) Notice: Subject to any disclaimer, the term of this patent is extended or adjusted under 35 U.S.C. 154(b) by 351 days.

(21) Appl. No.: 15/547,945

(22) PCT Filed: Feb. 2, 2016

(86) PCT No.: PCT/CN2016/073151
§ 371 (c)(1),
(2) Date: Aug. 1, 2017

(87) PCT Pub. No.: WO2017/132819
PCT Pub. Date: Aug. 10, 2017

(65) Prior Publication Data
US 2018/0128588 A1 May 10, 2018

(51) Int. Cl.
*G01B 3/12* (2006.01)
*G01C 22/02* (2006.01)
(Continued)

(52) U.S. Cl.
CPC ............... *G01B 3/12* (2013.01); *G01B 5/02* (2013.01); *G01B 11/28* (2013.01); *G01C 3/08* (2013.01);
(Continued)

(58) Field of Classification Search
CPC .................................................. G01B 3/12
(Continued)

(56) References Cited

U.S. PATENT DOCUMENTS 4,311,382 A * 1/1982 Buckley ............... G01C 15/02
248/480
5,161,313 A 11/1992 Rijlaarsadam
(Continued)

FOREIGN PATENT DOCUMENTS

CN 101451831 A 6/2009
CN 201342230 Y 11/2009
(Continued)

OTHER PUBLICATIONS

International Search Report for Application No. PCT/CN2016/073151, dated Oct. 17, 2017.

*Primary Examiner* — George B Bennett
(74) *Attorney, Agent, or Firm* — Anova Law Group, PLLC

(57) ABSTRACT

The present disclosure discloses a ranging system comprising a signal transmitter, a signal receiver, a ranging wheel, an electronic counter, an angle sensor and a data processing module integrated within a same device. The present disclosure also discloses a ranging system comprising a ranging device and a terminal device in communication with the ranging device, the ranging device comprises a signal transmitter, a signal receiver, a ranging wheel and an electronic counter, the terminal device comprising a data processing module. The ranging device or the terminal device also includes an angle sensor therein. The data processing module displays the received laser ranging information, or generates, in real-time, the travel trajectory of the ranging wheel based on distance information of the electronic counter and angle information of the angle sensor and draws the travel trajectory. The present disclosure may enable continuous measurement of any regular route, and meanwhile can also generate the corresponding travel trajectory and effectively improve the working efficiency; in addition, it may (Continued)

mark dots or mark lines for an actual construction site according to a pre-designed drawing.

12 Claims, 3 Drawing Sheets

(51) Int. Cl.
*G01C 15/00* (2006.01)
*G01C 7/04* (2006.01)
*G01C 3/08* (2006.01)
*G01C 21/14* (2006.01)
*G01B 5/02* (2006.01)
*G01B 11/28* (2006.01)
*G01B 7/02* (2006.01)

(52) U.S. Cl.
CPC ............... *G01C 7/04* (2013.01); *G01C 15/00* (2013.01); *G01C 21/14* (2013.01); *G01C 22/02* (2013.01); *G01B 7/023* (2013.01)

(58) Field of Classification Search
USPC ............................ 33/772, 773, 775, 779, 780
See application file for complete search history.

(56) References Cited

U.S. PATENT DOCUMENTS

| | | | | |
|---|---|---|---|---|
| 5,485,682 A * | 1/1996 | Le Breton | ................ | G01B 3/12 33/701 |
| 7,032,458 B2 | 4/2006 | Tanaka | | |
| 2002/0170201 A1 * | 11/2002 | Trout | ........................ | G01B 3/12 33/773 |
| 2004/0068886 A1 * | 4/2004 | Trout | ........................ | G01B 3/12 33/773 |
| 2004/0098873 A1 * | 5/2004 | Lam | ........................ | G01C 17/26 33/363 R |
| 2006/0150431 A1 | 7/2006 | Williams et al. | | |
| 2006/0267791 A1 * | 11/2006 | Chiang | ..................... | G01B 3/12 340/870.01 |
| 2006/0277781 A1 * | 12/2006 | Kim | ........................ | G01B 3/12 33/773 |
| 2008/0060210 A1 * | 3/2008 | Trout | ........................ | G01B 3/12 33/773 |
| 2008/0082119 A1 * | 4/2008 | Vitullo | ..................... | G01B 3/12 606/192 |
| 2014/0090264 A1 * | 4/2014 | Li | ........................... | G01S 17/10 33/760 |
| 2014/0190025 A1 * | 7/2014 | Giger | ................... | G01C 15/002 33/228 |
| 2018/0073848 A1 * | 3/2018 | Wang | ..................... | G01B 3/12 |

FOREIGN PATENT DOCUMENTS

| | | |
|---|---|---|
| CN | 102506683 A | 6/2012 |
| CN | 104118491 A | 10/2014 |
| CN | 203958374 U | 11/2014 |
| CN | 104634222 A | 5/2015 |
| CN | 204514232 U | 7/2015 |
| CN | 204789995 U | 11/2015 |
| EP | 2698600 A1 | 2/2014 |
| JP | 5847348 B1 | 1/2016 |
| WO | WO-01/75392 A2 | 10/2001 |

* cited by examiner

RANGING SYSTEM

TECHNICAL FIELD

The present disclosure relates to the field of mapping, and more particularly, to a ranging system.

BACKGROUND

The laser rangefinder, as a contact-less measuring instrument, has already been widely used in the fields of remote control, precise measurement, engineering construction, security monitor and intelligent control, etc. The working principle of the laser rangefinder is: a laser transmitter mainly transmits laser through a laser tube; the laser is reflected by the measured object and detected by a photosensitive diode and then a distance is determined by calculating the difference between the time when the laser is transmitted and the time when the laser is detected.

Currently, all the laser rangefinders can only measure a straight line distance and a target reflector at the destination of the measured object for reflecting the laser must exist. Distance cannot be measured for there is no target reflector or for curve line, polygonal line, thus greatly limiting the application scope of the laser rangefinder.

SUMMARY

The object of the present disclosure is to overcome the disadvantages of the prior art and provide a ranging system being able to achieve continuous measurement of a regular route or any irregular route and meanwhile generate a real-time travel trajectory.

To achieve the above object, the present disclosure provides the following technical solution: a ranging system, the ranging system comprises a signal transmitter, a signal receiver, a ranging wheel, an electronic counter, an angle sensor, a data processing module and a display module, wherein, each of the signal receiver, the electronic counter and the angle sensor is connected with the data processing module, the signal receiver receives a signal transmitted by the signal transmitter and converts the signal into an electric signal to be transferred to the data processing module, the data processing module processes the electric signal to obtain ranging information; the electronic counter transfers distance information of the ranging wheel to the data processing module, the angle sensor transfers angle information of the ranging wheel to the data processing module;

the data processing module transfers the ranging information to the display module for displaying, or generates, in real-time, a travel trajectory of the ranging wheel based on the distance information of the electronic counter and the angle information of the angle sensor, and draws the travel trajectory on the display module.

Preferably, the ranging system comprises a ranging device. The ranging device has a housing. The signal transmitter, the signal receiver and the data processing module are disposed in the housing. The ranging wheel is rotatably mounted on the housing. The electronic counter is integrated on the ranging wheel.

Preferably, the display module is exposed on a first surface of the housing and the ranging wheel is protruded from the housing.

Preferably, the data processing module marks the current travel trajectory of the ranging wheel according to a pre-designed travel trajectory.

Preferably, the angle sensor is an electronic gyroscope and the electronic gyroscope is connected to the data processing module.

Preferably, the data processing module is further configured to export the generated travel trajectory of the ranging wheel and the format of the exported travel trajectory is dwg, dxf, pdf, jpg, gif or bmp format.

The present disclosure also provides another technical solution: a ranging system, the ranging system comprises a ranging device and a terminal device, the ranging device includes a signal receiver, a signal transmitter, a ranging wheel and an electronic counter integrated therein, the terminal device comprises a data processing module, wherein, the ranging device or the terminal device also includes a display module and an angle sensor therein, the angle sensor is configured to obtain, in real-time, angle information of the ranging wheel when traveling;

a communication module is disposed on the ranging device and the terminal device, respectively, for transferring data in the ranging device to the terminal device;

the signal receiver receives a signal transmitted by the signal transmitter and converts the signal into an electric signal to be transferred to the data processing module to obtain ranging information, the data processing module transfers the ranging information to the display module for displaying, or generates, in real-time, a travel trajectory of the ranging wheel based on distance information of the electronic counter and angle information of the angle sensor and draws the travel trajectory on the display module.

Preferably, the data processing module comprises a memory for storing a pre-designed travel trajectory. The data processing module marks the current travel trajectory of the ranging wheel according to the pre-designed travel trajectory.

Preferably, the communication module is a wireless communication module or a wired communication module. The interface of the wired communication module is RS232, RS485, I2C, SPI or CAN; the communication method of the wireless communication module is Bluetooth, WiFi, Zigbee or RF communication.

Preferably, the terminal device is a smartphone, tablet computer, computer or handset.

Preferably, the ranging system further comprises a cloud server being networked with the terminal device, the cloud server is configured to store and share the data sent by the ranging system, the data sent by the ranging system includes: ranging information, distance information of the electronic counter, angle information of the angle sensor and/or a travel trajectory of the ranging wheel. The ranging system can obtain a pre-designed travel trajectory from the cloud server.

Compared with the prior art, the beneficial effects of the present disclosure are:

1. The present disclosure can measure a straight line, a polygonal line or any curve line, achieve versatility of the ranging device and improve the generality of its use.

2. The present disclosure utilizes the data measured by the ranging device to generate, in real-time, a drawing of travel trajectory on the terminal device. Not only the purpose of measuring a distance is achieved, but also a drawing of travel trajectory is generated in real-time, effectively improving the working efficiency.

3. The terminal device of the present disclosure can also accomplish marking dots or marking lines for a construction site, and a travel route can also be corrected during the marking procedure.

4. The ranging device and the terminal device of the present disclosure communicate with each other in wired or wireless manner. The terminal device is networked with a cloud server. This enables the measured data of the ranging device to be automatically exported onto the terminal device, which is easy for record and cloud storage, ensuring that the data never lost. Meanwhile the measured data or drawings can be shared to other engineering or design person in real-time, greatly improving the working efficiency.

Reference numbers: 1. Housing, 2. Ranging W74heel, 3. Display Module, 4. Signal Receiver, 5. Signal Transmitter.

DETAILED DESCRIPTION

A clear and complete description of the technical solution of the embodiments of the present disclosure will be made below in conjunction with the accompanying drawings of the present disclosure.

On the basis of realizing basic functions of straight line ranging, a ranging system disclosed by the present disclosure can also achieve measurements of distances of polygonal line or any curve line or area calculation of closed graphs; meanwhile drawings can be depicted according to the actually measured data, and it can also guide the travel trajectory of the ranging wheel in real-time according to the existing drawings and marking on an actual construction site, such as marking lines or marking dots.

Figure 1:
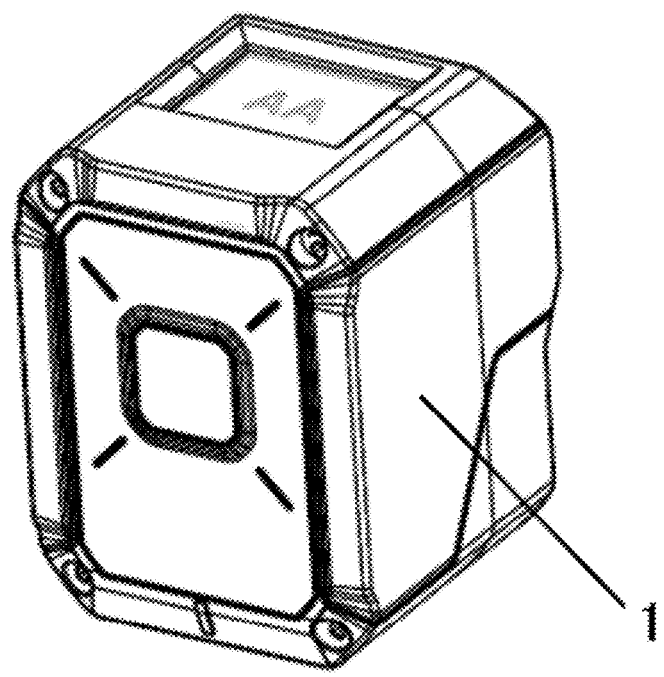
FIG. 1 is a perspective structural schematic diagram of a ranging system of the present disclosure.
Figure 2:
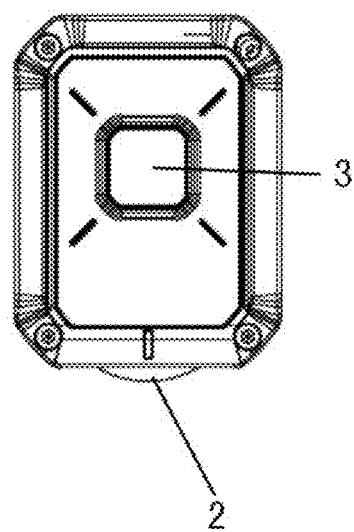
FIG. 2 is a front schematic diagram of FIG. 1.
Figure 3:
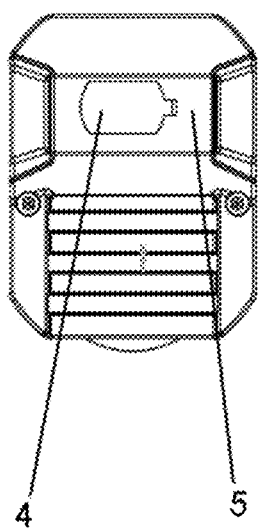
FIG. 3 is a cross-sectional schematic diagram of FIG. 1.

As is shown in conjunction with FIG. 1, FIG. 2 and FIG. 3, a ranging system of an embodiment of the present disclosure comprises a ranging device. A signal transmitter 5, a signal receiver 4, a ranging wheel 2, an electronic counter, an angle sensor, a data processing module and a display module 3 are integrated within the ranging device. The ranging device has a housing 1. The signal transmitter 5, the signal receiver 4, the angle sensor (not shown) and the data processing module (not shown) are disposed within the housing. The ranging wheel 2 is rotatably mounted on a side surface or bottom surface of the housing 1 and a part of the ranging wheel 2 is protruded from the side surface or bottom surface of the housing 1. Of course, the ranging wheel 2 can also be disposed on any other surface of the housing 1. The electronic counter is integrated on the ranging wheel. The display module 3 is exposed on a surface of the housing. The surface of the housing, on which the display module 3 is located, is perpendicular or opposite to the surface of the housing on which the ranging wheel is located. Of course, the locations on the housing 1, at which the display module 3 and the ranging wheel 2 of present disclosure are disposed, is not limited to what is defined herein. It's merely that these two are not located on the same surface of housing 1 in general implementations. The display module may be a liquid crystal display (LCD).

The signal receiver 4, for receiving a signal transmitted by the signal transmitter 5 and converting the signal to an electric signal to be transferred to the data processing module for processing, is connected with the data processing module to obtain ranging information; the electronic counter is integrated on the ranging wheel 2 and connected with the data processing module for counting the travel rounds of the ranging wheel 2 to obtain distance information of the traveled route of the ranging wheel 2, and transfers the distance information to the data processing module for processing; the angle sensor is connected with the data processing module for obtaining, in real-time, angle information of the ranging wheel 2 when traveling, and transferring the angle information to the data processing module for processing. An electronic gyroscope may be selected as the angle sensor.

Figure 4:
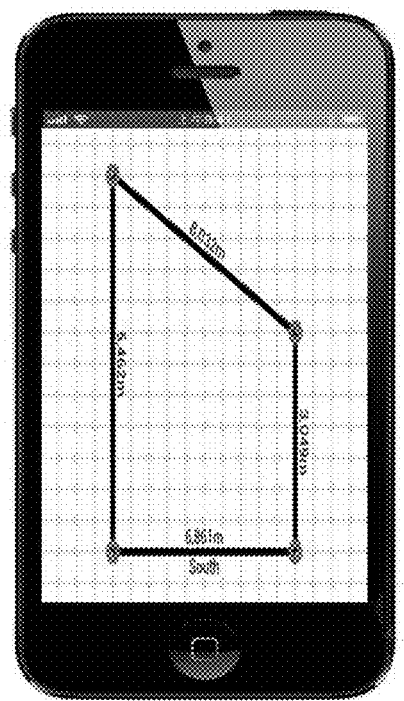
FIG. 4 is a schematic diagram of a regular travel trajectory generated by a ranging system of the present disclosure.
Figure 5:
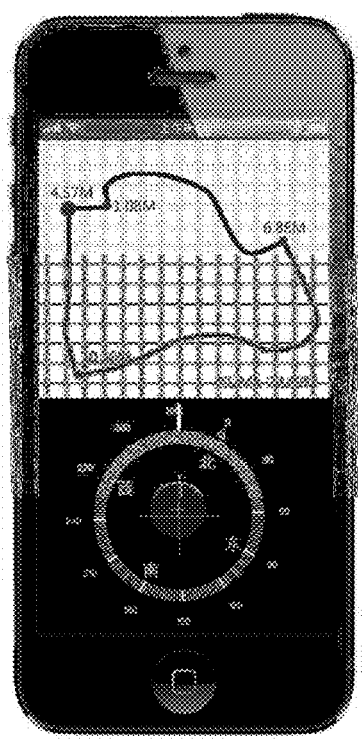
FIG. 5 is a schematic diagram of an irregular continuous travel trajectory generated by a ranging system of the present disclosure.

The data processing module transfers the ranging information obtained by the above mentioned processed procedure to the display module for displaying, or receives the distance information from the electronic counter and the angle information from the angle sensor, and calculates based on these two information, so as to draw, in real-time, a travel trajectory of the traveled route of the ranging wheel 2 on the display module. Various formats of corresponding drawings are generated which can be exported. The format of the generated drawings may be dwg, dxf, pdf, jpg, gif or bmp format. As shown in FIG. 4 and FIG. 5, which are schematic diagrams of a regular travel trajectory and an irregular continuous travel trajectory generated by a ranging system, respectively.

Transferring data from the signal transmitter 5 and the ranging wheel 2 to the data processing module can be switched. Of course, the signal transmitter and the electronic counter and angle sensor of the ranging wheel can also transfer data to the data processing module simultaneously.

The embodiments of the present disclosure utilize the data measured by the ranging device 1 to generate, in real-time, the drawings of travel trajectory on a self-equipped LCD. Not only the purpose of measuring a distance is achieved, but also a drawing of travel trajectory is generated in real-time, so as to effectively improve the working efficiency.

The ranging system of the present disclosure may also be used to marking lines or marking dots for a construction site. In particular, the data processing module also comprises a memory and a prompt module. The memory is used for storing a pre-designed travel trajectory. The data processing module determines the current travel trajectory of the ranging wheel based on the distance information and the angle information, and monitors the determined current travel trajectory of the ranging wheel according to the pre-designed travel trajectory. When the current travel trajectory of the ranging wheel deviates from the pre-designed travel trajectory, the deviation between the current travel trajectory and the pre-designed travel trajectory is output as a deviation data. The deviation data may be for example an adjusting angle and distance data required for correcting the current location of the ranging wheel to the pre-designed travel trajectory.

The memory in the data processing module of the embodiments of the present disclosure may also be used for storing the distance information, the angle information and the generated travel trajectory for subsequent call.

The prompt module is used for receiving the above mentioned deviation data, and is configured to give direction and/or distance prompt according to the deviation data to guide a user to correct the current travel route of the ranging wheel. The above pre-designed travel trajectory may have indication dots or indication lines. The prompt module may prompt or guide the user to mark dots or mark lines on the travel route of the ranging wheel according to the indication dots or indication lines.

A ranging system disclosed by another embodiment of the present disclosure comprises a ranging device and a terminal device. A signal transmitter, a signal receiver, a ranging wheel and an electronic counter are integrated within the ranging device. The terminal device comprises a data processing module. The ranging device or the terminal device also includes an angle sensor and a display module therein. The angle sensor is used for obtaining, in real-time, angle information of the ranging wheel when traveling. The ranging device has a housing. The signal transmitter and the signal receiver are disposed within the housing. The ranging wheel is rotatably mounted on a side surface or bottom surface of the housing and part of the ranging wheel is protruded from the side surface or bottom surface of the housing. Of course, the ranging wheel may also be disposed on any other surface of the ranging device. The electronic counter is integrated on the ranging wheel. The display module may be a liquid crystal display (LCD).

A communication module is disposed on each of the signal transmitter, the signal receiver, the electronic counter, the angle sensor and the terminal device. Through the communication module the signal receiver receives a signal transmitted by the signal transmitter and converts the signal into an electric signal to be sent to the data processing module for processing, to obtain a ranging information; the ranging wheel sends the distance information of the electronic counter and the angle information of the angle sensor to the data processing module. In the embodiments of the present disclosure, the communication module may be a wireless communication module, such as Bluetooth, WiFi, Zigbee or RF communication; it may also be a wired communication module, for example may be RS232, RS485, I2C, SPI or CAN. The angle sensor may be an electronic compass disposed in the ranging wheel and connected with the electronic counter, and may also be an electronic gyroscope disposed in the terminal device and connected with the data processing module.

The data processing module transfers the ranging information to the LCD for displaying, or receives the distance information from the electronic counter or the angle information form the angle sensor, and calculates based on the distance information and angle information of the ranging wheel, so as to draw, in real-time, a travel trajectory of the traveled route of the ranging wheel 2 on the LCD. Various formats of corresponding drawings are generated which can be exported. The format of the generated drawing may be dwg, dxf, pdf, jpg, gif or bmp format. As shown in FIG. 4 and FIG. 5, which are schematic diagrams of a regular travel trajectory and an irregular continuous travel trajectory generated by a ranging system, respectively.

Transferring data from the signal transmitter 5 and the ranging wheel to the data processing module can be switched. Of course, the signal transmitter and the electronic counter and angle sensor of the ranging wheel can also transfer data to the data processing module simultaneously.

Embodiments of the present disclosure utilize the data measured by the ranging device to generate, in real-time, the drawings of travel trajectory on the LCD of the terminal device. Not only the purpose of measuring a distance is achieved, but also a drawing of travel trajectory is generated in real-time, so as to effectively improve the working efficiency.

The ranging system of the present disclosure may also be used for marking lines or marking dots for a construction site. In particular, the data processing module also comprises a memory and a prompt module. The memory is used for storing a pre-designed travel trajectory. The data processing module determines the current travel trajectory of the ranging wheel based on the distance information and the angle information, and monitors the determined current travel trajectory of the ranging wheel according to the pre-designed travel trajectory. When the current travel trajectory of the ranging wheel deviates from the pre-designed travel trajectory, the deviation between the current travel trajectory and the pre-designed travel trajectory is output as a deviation data. The deviation data may be, for example, an adjusting angle and distance data required for correcting the current location of the ranging wheel to the pre-designed travel trajectory.

The memory in the data processing module of embodiments of the present disclosure may also be used for storing the distance information, the angle information and the generated travel trajectory for subsequent call.

The prompt module is used for receiving the above mentioned deviation data, and is configured to give direction and/or distance prompt according to the deviation data to guide a user to correct the current travel route of the ranging wheel. The above pre-designed travel trajectory may have indication dots or indication lines. The prompt module may prompt or guide the user to mark dots or mark lines on the travel route of the ranging wheel according to the indication dots or indication lines.

The terminal device of the present disclosure may be a smartphone, tablet computer, or handset.

The ranging system of the present disclosure may comprise a cloud server. The terminal device is networked with the cloud server. The cloud server is used for storing and sharing the data sent by the terminal device. The data may include: ranging information, distance information of the electronic counter, angle information of the angle sensor and/or a travel trajectory of the ranging wheel. The terminal device can obtain a pre-designed travel trajectory from the cloud server. As such the stored data may be called in real-time and the measured data or drawing is shared to other engineering or design person, effectively improving the working quality and efficiency. The travel trajectory generated by the data processing module, after being uploaded to the server, will become an available pre-designed travel trajectory.

Technical contents and technical features of the present disclosure have been disclosed above. However, those skilled in the art may make various replacements and modifications without departing from the spirit of the present disclosure based on the teachings of the present disclosure. Therefore, the scope of the present disclosure should not be limited to the contents disclosed by the embodiments, but should include various replacements and modifications without departing from the present disclosure, and covered by the claims of the present patent application.

What is claimed is:

1. A ranging system, comprising a signal transmitter, a signal receiver, a ranging wheel, an electronic counter, an angle sensor, a data processing module and a display module, wherein:

each of the signal receiver, the electronic counter and the angle sensor is connected with the data processing module, the signal receiver receives a signal transmitted by the signal transmitter and converts the signal into an electric signal to be transferred to the data processing module, the data processing module processes the electric signal to obtain ranging information; the electronic counter transfers distance information of the ranging wheel to the data processing module, the angle sensor transfers angle information of the ranging wheel to the data processing module; and the data processing module is configured to switch between performing:
- transferring the ranging information obtained from processing the electrical signal of the signal receiver to the display module for displaying; and
- generating, in real-time, a travel trajectory of the ranging wheel based on the distance information of the electronic counter and the angle information of the angle sensor, the travel trajectory configured to be displayed on the display module.

2. The ranging system of claim 1, characterized in that, the ranging system comprises a ranging device, the ranging device has a housing, the signal transmitter, the signal receiver and the data processing module are disposed within the housing, the ranging wheel is rotatably mounted on the housing, and the electronic counter is integrated on the ranging wheel.

3. The ranging system of claim 2, characterized in that, the display module is exposed on a first surface of the housing and the ranging wheel is protruded from the housing.

4. The ranging system of claim 1, characterized in that, the data processing module marks the current travel trajectory of the ranging wheel according to a pre-designed travel trajectory.

5. The ranging system of claim 1, characterized in that, the angle sensor is an electronic gyroscope and the electronic gyroscope is connected to the data processing module.

6. The ranging system of claim 1, characterized in that, the data processing module is further configured to export the generated travel trajectory of the ranging wheel and the format of the exported travel trajectory is dwg, dxf, pdf, jpg, gif or bmp format.

7. A ranging system, characterized in that, the ranging system comprises a ranging device and a terminal device, the ranging device including a signal receiver, a signal transmitter, a ranging wheel and an electronic counter integrated therein, the terminal device comprising a data processing module, wherein, the ranging device or the terminal device further includes a display module and an angle sensor therein, the angle sensor is configured for obtaining, in real-time, angle information of the ranging wheel when traveling;

a communication module is disposed on the ranging device and the terminal device, respectively, to transfer data in the ranging device to the terminal device;

the signal receiver receives a signal transmitted by the signal transmitter and converts the signal into an electric signal to be transferred to the data processing module to obtain ranging information; and the data processing module is configured to switch between performing:
- transferring the ranging information to the display module for displaying; and
- generating, in real-time, a travel trajectory of the ranging wheel based on distance information of the electronic counter and angle information of the angle sensor, the travel trajectory configured to be displayed on the display module.

8. The ranging system of claim 7, characterized in that, the data processing module comprises a memory for storing a pre-designed travel trajectory and the data processing module marks the current travel trajectory of the ranging wheel according to the pre-designed travel trajectory.

9. The ranging system of claim 7, characterized in that, the communication module is a wireless communication module or a wired communication module, the interface of the wired communication module is RS232, RS485, I2C, SPI or CAN; the communication method of the wireless communication module is Bluetooth, WiFi, Zigbee or RF communication.

10. The ranging system of claim 7, characterized in that, the terminal device is a smartphone, tablet computer, computer or handset.

11. The ranging system of claim 7, characterized in that, the ranging system further comprises a cloud server being networked with the terminal device, the cloud server is configured to store and share the data sent by the ranging system, the data sent by the ranging system includes: ranging information, distance information of the electronic counter, angle information of the angle sensor and/or a travel trajectory of the ranging wheel, and the ranging system can obtain a pre-designed travel trajectory from the cloud server.

12. The ranging system according to claim 1, wherein a first surface of the housing on which the display module is located is perpendicular or opposite to a second surface of the housing on which the ranging wheel is located.

* * * * *